United States Patent
Wang

(10) Patent No.: US 7,983,341 B2
(45) Date of Patent: Jul. 19, 2011

(54) STATISTICAL CONTENT BLOCK MATCHING SCHEME FOR PRE-PROCESSING IN ENCODING AND TRANSCODING

(75) Inventor: Zhicheng Lancelot Wang, Los Altos, CA (US)

(73) Assignee: Ericsson Television Inc., Duluth, GA (US)

( * ) Notice: Subject to any disclaimer, the term of this patent is extended or adjusted under 35 U.S.C. 154(b) by 1592 days.

(21) Appl. No.: 11/329,685

(22) Filed: Jan. 10, 2006

(65) Prior Publication Data

US 2006/0188020 A1    Aug. 24, 2006

Related U.S. Application Data

(60) Provisional application No. 60/656,663, filed on Feb. 24, 2005.

(51) Int. Cl.
*H04N 7/12* (2006.01)

(52) U.S. Cl. ......... 375/240.16; 375/240.12; 375/240.23; 375/240.24; 375/240.26

(58) Field of Classification Search ............. 375/240.16, 375/240.12, 240.24, 240.23, 240.26, 240.11–240.17
See application file for complete search history.

(56) References Cited

U.S. PATENT DOCUMENTS

| | | | | |
|---|---|---|---|---|
| 6,130,912 A * | 10/2000 | Chang et al. | ............. | 375/240.16 |
| 6,160,846 A * | 12/2000 | Chiang et al. | ............. | 375/240.05 |
| 7,260,148 B2 * | 8/2007 | Sohm | ............. | 375/240.16 |
| 2002/0136302 A1 * | 9/2002 | Lu | ............. | 375/240.16 |
| 2003/0112873 A1 * | 6/2003 | Demos | ............. | 375/240.17 |
| 2004/0258154 A1 * | 12/2004 | Liu et al. | ............. | 375/240.16 |
| 2005/0286777 A1 * | 12/2005 | Kumar et al. | ............. | 382/232 |
| 2006/0002474 A1 * | 1/2006 | Au et al. | ............. | 375/240.16 |

OTHER PUBLICATIONS

Metaxas et al. "shape and nonrigid motion estimation though physic based synthesis";Jun. 1993,IEEE transactions on pattern analysis and machine intelligence,vol. 15,No. 6,pp. 580-591.*

Choi et. al. "Fast motion estimation and mode decision with variable motion block sizes",2003;visual communications and image processing,vol. 5150,pp. 1561-1572.*

* cited by examiner

*Primary Examiner* — Dac V. Ha
*Assistant Examiner* — Rahel Guarino

(57) ABSTRACT

Statistical content block matching for video pre-processing, for example in fast motion estimation, uses a second-order distortion criterion for processing steps such as identifying a best reference image portion for comparison with a current image portion. The second-order distortion criterion is a Lagrange-optimized combination of a mean squared error criterion with an entropy criterion. Then a fast motion estimation search advantageously includes performing a diamond search using the second-order distortion criterion to identify a candidate best reference image portion, and performing a nearest neighbor search starting using said second-order distortion criterion to identify the best reference image portion within a search range limited by an adaptive search range cap. A better motion vector can then be calculated.

12 Claims, 3 Drawing Sheets iPLEX HARDWARE ARCHITECTURE

STATISTICAL CONTENT BLOCK MATCHING SCHEME FOR PRE-PROCESSING IN ENCODING AND TRANSCODING

RELATED APPLICATION

This application claims benefit under 35 U.S.C. §119 as a continuation of U.S. Provisional Application No. 60/656,663, filed Feb. 24, 2005.

FIELD OF THE INVENTION

This application outlines a new statistical content block matching scheme for motion estimation, video temporal pre-processing, optimizations and applications in encoding and transcoding environments.

BACKGROUND OF THE INVENTION

Video and image pre-processing technology is used widely in video processing, compression, broadcasting, storage and broadband networking, imaging, printing and other areas for achieving better quality and higher efficiency. In the video coding and transcoding fields, pre-processing provides the advantages of obvious visual quality enhancement and substantial compression efficiency by noise reduction and visual enhancement of corrupted or distorted video sequences from the capture source or transmission processes.

Pre-processing technology is also becoming necessary in video compression, storage and transportation, because high quality pre-processing provides a real differential and advantageous technological edge in terms of yielding both a high visual quality and a high compression ratio, particularly in the Video-over-IP, HDTV and related markets. To give a quantitative example, the advantageous pre-processing scheme in accordance with the present invention can result in a visual quality improvement of about 3 dB in signal to noise ratio and about 50-60% in coding efficiency gain. This is an improvement even greater than that achievable under the H.264 (Advanced Video Coding) standard over the MPEG-2 standard.

Furthermore, due to the nature of video sequences, motion estimation has been used in a variety of video processing and compression applications, including pre-processing. There are numerous motion estimation algorithms known in the literature for image processing, visual noise reduction filtering and video compression. However, many of these algorithms are too expensive in computational complexity to be implemented, or they are unsatisfactory in their performance. Indeed, some algorithms are both too expensive and unsatisfactory.

The new pre-processing optimization combined with later stage encoding or transcoding optimization in accordance with the statistical content block matching scheme of the present invention yields a more advanced and competitive approach.

The following is a brief overview of certain areas of information forming the background to the present invention.

(A) Encoding

The present invention is advantageously embodied in a video encoder. A conventional video encoder is preferably an encoder which utilizes a video compression algorithm to provide, for example, an MPEG-2 compatible bit stream. The MPEG-2 bit stream has six layers of syntax. These are a sequence layer (random access unit, context), Group of Pictures layer (random access unit, video coding), picture layer (primary coding layer), slice layer (resychronization unit), macroblock (motion compensation unit), and block layer (DCT unit). The encoder distinguishes between three kinds of pictures, I ("intra"), P ("predictive") and B ("bi-predictive"). A group of pictures (GOP) is a set of frames which starts with an I-picture and includes a certain number of P and B pictures. The number of pictures in a GOP may be fixed. The coding of I pictures results in the greatest number of bits. In an I-picture, each 8×8 block of pixels is defined as a macroblock and undergoes a DCT transform to form an 8×8 array of transform coefficients. The transform coefficients are then quantized with a variable quantizer matrix. The resulting quantized DCT coefficients are scanned using, e.g., zig-zag scanning, to form a sequence of DCT coefficients. The DCT coefficients are then organized into run, level pairs. The run, level pairs are then entropy encoded. In an I-picture, each macroblock is encoded according to this technique, which is known as spatial encoding.

In a P-picture, a decision is made to code the macroblock as an I macroblock or as a P macroblock. For each P macroblock, a prediction of the macroblock in a previous video picture is obtained. While this technique is discussed in more detail below, generally the prediction macroblock is identified by a motion vector which indicates the translation between the macroblock to be coded in the current picture and its "best match" prediction in a previous picture. The predictive error between the prediction macroblock and the current macroblock is then coded using the DCT, quantization, scanning, run, level pair encoding, and entropy encoding.

In the coding of a B-picture, a decision has to be made as to the coding of each macroblock. The choices are (a) intracoding (as in an I macroblock), (b) unidirectional backward predictive coding using a subsequent picture to obtain a motion compensated prediction, (c) unidirectional forward predictive coding using a previous picture to obtain a motion compensated prediction, and (d) bidirectional predictive coding wherein a motion compensated prediction is obtained by interpolating a backward motion compensated prediction and a forward motion compensated prediction. In the cases of forward, backward, and bidirectional motion compensated prediction, the predictive error is encoded using DCT, quantization, zig-zag scanning, run, level pair encoding, and entropy encoding.

B pictures have the smallest number of bits when encoded, then P pictures, with I pictures having the most bits when encoded. Thus, the greatest degree of compression is achieved for B pictures. For each of the I, B, and P pictures, the number of bits resulting from the encoding process can be controlled by controlling the quantizer step size. A macroblock of pixels or pixel errors which is coded using a large quantizer step size results in fewer bits than if a smaller quantizer step size is used. Other techniques may also be used to control the number of encoded bits.

(B) Motion Estimation

As indicated above, temporal encoding typically involves finding a prediction macroblock for each to-be-encoded macroblock. The prediction macroblock is subtracted from the to-be-encoded macroblock to form a prediction error macroblock. The individual blocks of the prediction error macroblock are then spatially encoded.

Each prediction macroblock originates in a picture other than the to-be-encoded picture, called a "reference picture." A single prediction macroblock may be used to "predict" a to-be-encoded macroblock or multiple prediction macroblocks, each origination in a different reference picture, may be interpolated, and the interpolated prediction macroblock may be used to "predict" the to-be-encoded macroblock. Preferably, the reference picture, themselves, are first encoded and then decompressed or "decoded." The prediction macroblocks used in encoding are selected from "reconstructed pictures" produced by the decoding process. Reference pictures temporally precede or succeed the to-be-encoded picture in the order of presentation or display. Based on these reference pictures, the I, P and B encoded pictures may be produced.

MPEG-2 supports several different types of prediction modes which can be selected for each to-be-encoded macroblock, based on the types of predictions that are permissible in that particular type of picture. Of the available prediction modes, two prediction modes are described below which are used to encoded frame pictures. According to a "frame prediction mode" a macroblock of a to-be-encoded frame picture is predicted by a frame prediction macroblock formed from one or more reference frames. For example, in the case of a forward only predicted macroblock, the prediction macroblock is formed from a designated preceding reference frame. In the case of backward only predicted macroblock, the prediction macroblock is formed from a designated succeeding reference frame. In the case of a bi-predicted macroblock, the prediction macroblock is interpolated from a first macroblock formed from the designated preceding reference frame and a second prediction macroblock formed from the designated succeeding reference frame.

According to a "field prediction mode for frames" a macroblock of a to-be-encoded frame picture is divided into to-be-encoded top and bottom field macroblocks. A field prediction macroblock is separately obtained for each of the to-be-encoded top and bottom field macroblocks. Each field prediction macroblock is selected from top and bottom designated reference fields. The particular fields designated as reference fields depend on whether the to-be-encoded field macroblock is the first displayed field of a P-picture, the second displayed field of a P-picture or either field of a B-picture. Other well known prediction modes applicable to to-be-encoded field pictures include dual prime, field prediction of field pictures and 16×8 prediction. For sake of brevity, these modes are not described herein.

Prediction macroblocks often are not at the same relative spatial position (i.e., the same pixel row and column) in the reference picture as the to-be-encoded macroblock spatial position in the to-be-encoded picture. Rather, a presumption is made that each prediction macroblock represents a similar portion of the image as the to-be-encoded macroblock, which image portion may have moved spatially between the reference picture and the to-be-encoded picture. As such, each prediction macroblock is associated with a motion vector, indicating a spatial displacement from the prediction macroblock's original spatial position in the reference field to the spatial position corresponding to the to-be-encoded macroblock. This process of displacing one or more prediction macroblocks using a motion vector is referred to as motion compensation.

In motion compensated temporal encoding, the best prediction macroblock(s) for each to-be-encoded macroblock is generally not known ahead of time. Rather, a presumption is made that the best matching prediction macroblock is contained in a search window of pixels of the reference picture around the spatial coordinates of the to-be-encoded macroblock (if such a prediction macroblock exists at all). Given a macroblock of size I×J pixels, and a search range of ±H pixels horizontally and ±V pixels vertically, the search window is of size (1+2H)(J+2V). A block matching technique may be used, whereby multiple possible prediction macroblock candidates at different spatial displacements (i.e., with different motion vectors) are extracted from the search window and compared to the to-be-encoded macroblock. The best matching prediction macroblock candidate may be selected, and its spatial displacement is recorded as the motion vector associated with the selected prediction macroblock. The operation by which a prediction macroblock is selected, and its associated motion vector is determined, is referred to as motion estimation.

Block matching in motion estimation requires identifying the appropriate search window for each to-be-encoded macroblock (that can possibly be temporally encoded). Then multiple candidate macroblocks of pixels must be extracted from each search window and compared to the to-be-encoded macroblock. According to the MPEG-2 chrominance format 4:2:0, for example, each macroblock includes a 2×2 arrangement of four (8×8 pixel) luminance blocks (illustratively, block matching is performed only on the luminance blocks). If each to-be-encoded picture is a CIF format picture (352×288 pixels for NTSC frames and 352×144 for NTSC fields), then the number of to-be-encoded macroblocks is 396 for frame pictures and 196 for each field picture. According to MPEG-2, the search range can be as high as ±128 pixels in each direction. Furthermore, consider that MPEG-2 often provides a choice in selecting reference pictures for a to-be-encoded picture (i.e., a field-frame choice or a forward only, backward only or bi-predictive interpolated choice). In short, the number of potential candidate prediction macroblocks is very high. An exhaustive comparison of all prediction macroblock candidates to the to-be-encoded macroblock may therefore be too processing intensive for real-time encoding.

An exhaustive search can sometimes provide better memory access efficiency due to the overlap in pixels in each prediction macroblock candidate compared against a given to-be-encoded macroblock. For example, consider that a retrieved prediction macroblock candidate of 16×16 pixels includes a sub-array of 15×16 pixels of the prediction macroblock candidate to the immediate right or left (an of course a sub-array of 16×15 pixels of the prediction macroblock candidate immediately above or below). Thus only the missing 1×16 column of pixels need be retrieved to form the next left or right prediction macroblock candidate (or the missing 1×16 row of pixels need be retrieved to form the next above or below prediction macroblock candidate).

According to another technique, a hierarchical or telescopic search is performed, in which fewer than all possible choices are examined. These techniques, while computationally less demanding, are more likely to fail to obtain the optimal or best matching prediction macroblock candidate. As a result, more bits may be needed to encode the to-be-encoded macroblock in order to maintain the same quality than in the case where the best matching macroblock is obtained, or, if the number of bits per picture is fixed, the quality of the compressed picture will be degraded. Note also that the memory access efficiency is lower for the hierarchical search, since by definition, the amount of overlapping pixels between each prediction macroblock will be lower.

(C) Video Buffer Verifier

The encoding techniques described above produce a variable amount of encoded data for each picture (frame or field) of the video signal. The amount of encoded data produced for each picture depends on a number of factors including the amount of motion between the to-be-encoded picture and other pictures used as references for generating predictions therefor. For example, a video signal depicting a football game tends to have high motion pictures and a video signal depicting a talk show tends to have low motion pictures. Accordingly, the average amount of data produced for each picture of the football game video signal tends to be higher than the average amount of data produced for each picture of comparable quality of the talk show.

The allocation of bits from picture to picture or even within a picture may be controlled to generate a certain amount of data for that picture. However, the buffer at the decoder has a finite storage capacity. When encoding a video signal, a dynamically adjusted bit budget may be set for each picture to prevent overflow and underflow at the decoder buffer given the transmission bit rate, the storage capacity of the decoder buffer and the fullness of the decoder buffer over time. Note that varying the number of bits that can be allocated to a picture impacts the quality of the pictures of the video signal upon decoding.

The bit budget is set to prevent a decoder buffer underflow or overflow given a certain transmission channel bit rate. In order to prevent decoder buffer underflow and overflow, the encoder models the decoder buffer in order to determine the fullness of the decoder's buffer from time to time. The behavior of the decoder buffer is now considered in greater detail.

In modeling the decoder buffer, the encoder determines the buffer fullness of the decoder buffer. The encoder can know how many bits are present in the decoder buffer given the allocated transmission channel bit rate at which such pictures are transmitted to the decoder buffer, the delay between encoding a picture at the encoder and decoding a picture at the decoder, and the knowledge that the decoder buffer is assumed to remove the next to be decoded picture instantaneously at prescribed picture intervals. The encoder attempts to determine each maximum and minimum of the decoder buffer's fullness, which correspond to the number of bits in the buffer immediately before the decoder removes a picture and the number of bits in the buffer immediately after the decoder removes a picture, respectively. Given such information, the encoder can determine the number of bits to allocate to successive pictures to prevent decoder buffer underflows (when the decoder buffer does not have all of the bits of a picture in time for the decoder to decode them at a predefined decode time) or overflows (when the decoder buffer fullness exceeds the maximum decoder buffer storage capacity).

(D) Resolution/Standards Conversion

The use of high resolutions, high bit rates and/or inter-frame encoding can increase the difficulty of processing functions such as accessing stored compressed video streams, playing back more than one bit stream at the same time, and decoding/decompressing with trick modes such as fast forward and fast reverse. On the other hand, a compression system which utilizes compressed video bit streams having low resolution, low bit rate and/or only intra-frame encoding does not suffer these drawbacks. It is therefore desirable in many applications to provide a system in which multiple resolution and/or multiple bit rate versions of a given video signal can be compressed and stored. The high resolutions, high bit rates and inter-frame encoding can then be utilized when necessary, while the advantages of low resolution, low bit rates and intra-frame encoding can also be provided in appropriate applications.

Video servers represent another application in which storage of multiple versions of compressed video bit streams is desirable. Such video servers are used to deliver video bit streams to end users over data communication networks. For example, a World Wide Web server may be used to deliver video bit streams to different end users over different types of lines, including plain old telephone service (POTS) lines, integrated services digital network (ISDN) lines, T1 lines and the like. A version of a given compressed bit stream that may be suitable for a POTS user would be considered poor quality by a T1 user, and a bit stream suitable for a T1 user would be at too high a bit rate for a POTS user. It is therefore desirable for the video server to store a given video bit stream at multiple bit rates. The "optimal" resolution for a compressed video bit stream is the one that yields the best subjective video quality after decompression. This optimal resolution generally decreases with bit rate, such that it is desirable for the video server to compress the different bit rate streams at different resolutions.

The name of the process of converting a media file or object from one format to another is transcoding. Transcoding is often used to convert video formats (e.g., Beta to VHS, VHS to QuickTime, QuickTime to MPEG etc.). It can also be used in applications such as fitting HTML files and graphics files to the unique constraints of mobile devices and other Web-enabled products.

(E) Re-Encoding

Many video encoding applications utilize statistical multiplexing techniques to combine several compressed video bit streams into a single multiplexed bit stream, e.g., for transmission on a single channel. The bit rate of a given compressed stream generally varies with time based on the complexity of the corresponding video signals. A statistical multiplexer attempts to estimate the complexity of the various video frame sequences of a video signal and allocates channel bits among the corresponding compressed video bit streams so as to provide an approximately constant level of video quality across all of the multiplexed streams. For example, a given video frame sequence with a relatively large amount of spatial activity or motion may be more complex than other sequences and therefore allocated more bits than the other sequences.

Some statistical multiplexers use only a priori statistics, while others use both a priori and a posteriori statistics in allocating available channel bits. A statistics gatherer and encoder element 72 receives n video signals. These a priori statistics may include pre-encoding statistics gathered during the encoding of the respective video signal, or other a priori statistics (e.g., inter-pixel differences). To generate the a posteriori statistics, the compressed video bit streams and the a priori statistics are retrieved. A transcoder has a decoder portion which decodes the retrieved compressed video bit streams to reproduce the video signals and an encoder portion which re-encodes the reproduced video signals to produce re-compressed video signals. In re-encoding the reproduced video signals, the transcoder gathers a posteriori statistics indicating the complexity involved in re-encoding the reproduced video signals. These a posteriori statistics and the a priori statistics are used in allocating available channel bits to achieve a desired bit rate.

SUMMARY OF THE INVENTION

Thus, a comprehensive statistical content block matching scheme usable, for example, in a pre-processing motion estimation scheme is presented, including but not limited to the following innovative areas:

1. The combination and process of three major components: distortion criterion, motion prediction, and hybrid search.

2. An optimization object function $J(\Delta x, \Delta y)$ and MSE used in calculations for: optimal visual quality, unique application in variable block size encoding in an encoder or transcoder, entropy calculation combined with encoding bit rate control process, faster computation and implementation.

3. A new three-level motion search process from coarse to fine: motion vector prediction as efficient initialization, first-step diamond search, and on-the-fly nearest neighbor search, which yields faster results than a logarithmic value of the search range and optimal performance similar to the full search.

4. The unique idea of entropy reduction in motion estimation and its implementation.

5. The new idea and implementation of the combined motion estimation for both pre-processing and encoding/transcoding.

6. On-the-fly neighboring motion (search) range adaptation to get a consistent and high quality motion result and avoid unnecessary computations.

7. On-the-fly nearest neighbor search with on-the-fly pixel interpolation for high motion vector accuracy at sub-pixel (fractional value) levels for high quality video compression and processing applications/markets.

8. The DSP implementation and optimization, memory architecture and data flow, and other optimal implementation details.

In a preferred embodiment, a method of statistical content block matching for video pre-processing, comprising in accordance with the present invention comprises, in the recited order, the steps of:

First: (A) selecting a second-order distortion criterion for identifying a best reference image portion for comparison with a current image portion, said second-order distortion criterion being a Lagrange-optimized combination of a mean squared error criterion with an entropy criterion;

Second: (B) using said second-order distortion criterion to select an initial reference image portion as an initial starting point for a motion estimation search, said initial starting position being chosen based on at least one motion vector from a neighboring image portion; and Third: (C) performing a fast motion estimation search including the steps of:

Fourth: (i) performing a diamond search starting from said initial reference image portion using said second-order distortion criterion to identify a candidate best reference image portion;

Fifth: (ii) performing a nearest neighbor search starting from the candidate best reference image portion using said second-order distortion criterion to identify either the candidate best reference image portion or a different neighboring reference image portion as a better reference image portion within a search range limited by an adaptive search range cap;

Sixth: (iii) re-identifying the better reference image portion as the candidate best reference image portion;

Seventh: (iv) repeating said steps (ii) and (iii) until in said step (ii) either (a) the candidate best reference image portion is identified as the better reference image portion so that said second-order distortion criterion cannot be improved, or (b) any further search would exceed the adaptive search range cap;

Eighth: (v) identifying the candidate best reference image portion as the best reference image portion; and Ninth: (vi) calculating a motion vector from the best reference image portion.

These and other aspects and features of the present invention are described below in the following detailed description of certain preferred embodiments, taken together with the accompanying drawings.

DETAILED DESCRIPTION OF THE PREFERRED EMBODIMENTS

Herein, an inventive statistical content block matching scheme embodied in a motion estimation scheme for temporal pre-processing is outlined for high performance and real-time DSP implementation. The motion estimation scheme can also be utilized in a compatible way for both pre-processing and later stage compression such as encoding and transcoding, yielding even better results.

Figure 3:
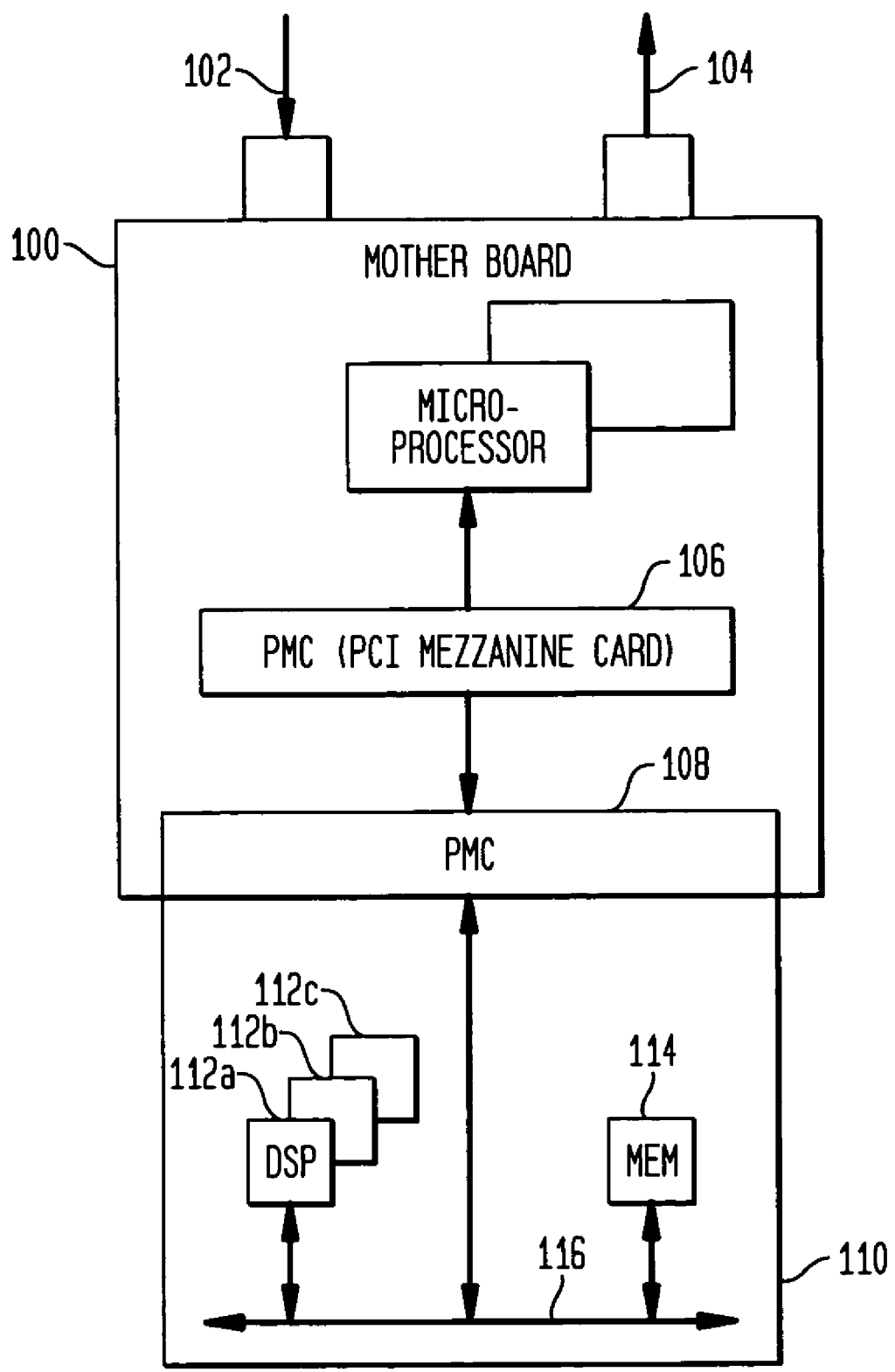
FIG. 3 is a conceptual block diagram of an iPlex™ motherboard as an advantageous example of hardware usable for implementing aspects of the present invention including, but not limited to, the advantageous methods and signals described below.
Figure 4:
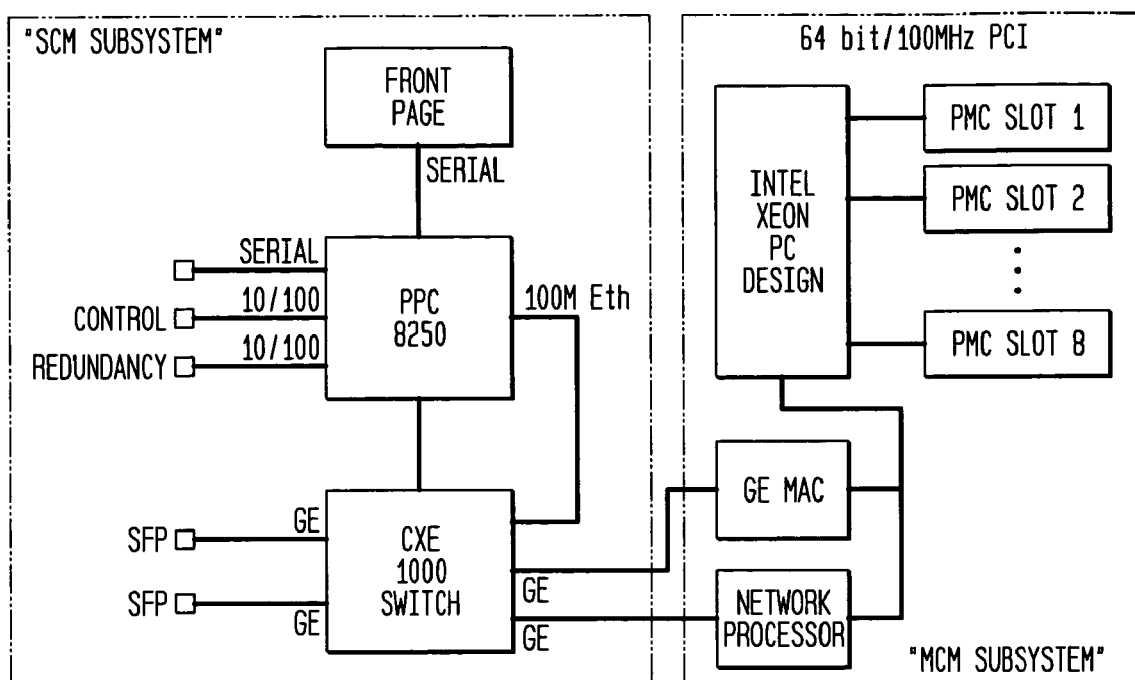
FIG. 4 is further block diagram of the iPlex™ Hardware Architecture.

One advantageous embodiment of hardware for implementing any or all of the aspects of this inventive motion estimation scheme is illustrated in FIGS. 3 and 4. Especially as shown in FIG. 3, the hardware is embodied in an iPlex™ motherboard (iPlex™ is a trademark of SkyStream Corporation, assignee of the present application). The motherboard 100, which advantageously is powered by two Pentium® processors, includes an input structure 102 for receiving signals including, but not limited to, video signals, and an output structure 104 for outputting signals including, but not limited to, video signals.

The motherboard 100 advantageously includes a plurality of PCI Mezzanine Cards ("PCM"), such as PCM 106 and PCM 108. Each PCM 106, 108 is a PCI ("Peripheral Component Interconnect") interface for receiving data, e.g., video data, from another PCM or from the external to the motherboard 100 through input structure 102, and/or transmitting such data to another PCM or to the external of the motherboard 100 through output structure 104.

Connected to each PCM 106, 108 is a respective Advanced Video Encoder™ ("AVE") card 110 (Advanced Video Encoder™ is a trademark of SkyStream Corporation, assignee of the present application). The AVE card 110 includes a plurality of DSPs 112a-112c for running computer software for performing a variety of functions including, but not limited to, the advantageous methods of the present invention. Each AVE card 110 further includes memory 114, connected to the DSPs 112a-112c via a bus structure 116. Memory 114 is adapted to store data including, but not limited to, video data pending pre-processing, noise-filtering and/or encoding in accordance with the present invention, and video data that has been pre-processed, noise-filtered and/or encoded in accordance with the present invention, or both. Accordingly, the DSPs 112a-112c constitute structure for performing the various steps of any of the methods in accordance with the present invention.

It will be understood, of course, that any other effective structure, such as application specific integrated circuits or finite state automata, may be used in place of the above-described structures for implementing the present invention.

Advantageous methods and signals in accordance with preferred embodiments of the present invention that may be implemented using the motherboard 100, other structure properly incorporating AVE cards 110, or other effective structure will now be described.

1. Fast Motion Estimation For Temporal Pre-Processing

The present invention is directed to a fast motion estimation approach for video temporal pre-processing. Advantageously, an embodiment of this invention consists of one or more of three major portions: the selection of the distortion function criterion, the method of motion vector prediction, and an optimal fast search scheme, presented in the following sections.

1.2 The Distortion Function Criterion For High Quality Images

The distortion function criterion is the criterion for identifying which of the candidate prediction macroblocks is the "best match." Consequently, defining the distortion function criterion is a very important part of a motion estimation method in terms of computational complexity and performance. The goal of motion estimation schemes is to reach the global minimum of a well-defined distortion function criterion in a fast and efficient way.

One conventional criterion, the sum of absolute differences (SAD), is given by:

$$SAD = \sum_{i=0}^{15} \sum_{j=0}^{15} |C_{ij} - R_{ij}|^2$$

where $C_{ij}$ and $R_{ij}$ denote the current and reference image intensity at spatial location $(i, j)$, respectively.

The SAD function is a widely used distortion function criterion in the video compression domain for its low and practical complexity and relatively good quality for video coding. However, in a pre-processing operation like noise reduction for coding efficiency, the SAD function might not be a good choice due to the noisy input video data or/and reconstructed blocky image sequences in encoding and transcoding environments, respectively. The SAD function weights the error uniformly and its function is easily affected by input distortion like noise data and blocky image due to compression loss.

The SAD function is a first-order statistical function, i.e., the terms in the sum are first-order. On the other hand, general image/video pre-processing algorithms are mostly derived from optimization on the basis of second-order statistical characteristics and features like image data energy. The present invention recognizes that selecting a second-order distortion function can improve results by using complementary characteristics.

In accordance with the present invention, the distortion function criterion $J(\Delta x, \Delta y)$ is proposed to be the mean squared error (MSE), advantageously in combination with entropy Lagrange optimization.

$$MSE = \frac{1}{N \cdot M} \sum_{i=0}^{N-1} \sum_{j=0}^{M-1} (C_{ij} - R_{ij})^2$$

$$J(\Delta x, \Delta y) = MSE(\Delta x, \Delta y) + \lambda \cdot E(\Delta x, \Delta y),$$

where $E(\Delta x, \Delta y)$ is the entropy of the image sequence. $E(\Delta x, \Delta y)$ is defined as follows:

$$E(\Delta x, \Delta y) = -\sum_{i=0}^{N-1} \sum_{j=0}^{M-1} p_{ij}\log_2 p_{ij} - q_{ij}\log_2 q_{ij},$$

where $p_{ij}$ is the probability of the pixel value at the location $(i,j)$ of the relevant macroblock in the reference image, and $q_{ij}$ is the probability of the pixel value at the location $(i,j)$ of the relevant macroblock in the current image.

The probabilities $p_{ij}$ and $q_{ij}$ can be calculated according to one of several techniques. For example, the sample (luminance and chrominance) values of each pixel can be detected in a given image. Then, a probability distribution of the possible pixel values can be constructed using all of the sample values measured in that given image. Alternatively, the sample value of a specific pixel location i,j can be detected over a sequence of images. A probability distribution of the possible pixel values can then be constructed over time (i.e., over the sequence of images) for that specific pixel position i,j. Such a temporal probability distribution can be constructed for each pixel position. Illustratively, an auto-regression technique may be employed to generate such a temporal probability distribution. In the case of the reference image, it might be useful to use the sample values of the pixel after noise filtering, in the case the motion estimation technique is used in a noise filtering pre-processing application, or to use the decoded, reconstructed sample values, in the case the motion estimation technique is used in a compression application.

The MSE distortion function criterion fits naturally into the pre-processing optimization operations because the pre-processing filters are derived based on this criterion. Accordingly, a motion estimation scheme in accordance with the present invention that also uses this criterion would perform well with such pre-processing filters.

From another perspective, the idea behind the MSE distortion function criterion is to always apply the temporal filter in the direction of highest correlation. The motion direction is chosen by searching over a range, and the direction with the minimum variance estimation is selected.

Using the MSE distortion function criterion is also very handy for variable block-size operations as in MPEG 2 to H.264 transcoding or encoding. In the case that both N and M are powers of 2, which is usually the case in video compression, the division can be done by a right shift, which is ideal for computational implementation. Due to the current processing platforms, multiplication is no longer an expensive operation. For instance, most current powerful DSP processors use one cycle for a multiplication operation with one-cycle latency which could be covered by pipelined operations. A multiplication operation can be faster than an absolute operation on most processor platforms.

The entropy estimation can be a bit expensive. Therefore, for a simple, fast and practical implementation, a simplified optimization can be used as follows:

Min($J(\Delta x, \Delta y)$)=Min($MSE(\Delta x, \Delta y)$).

Even this motion estimation can be used with the encoding or transcoding process to get an improved combined result of pre-processing and encoding (or transcoding) optimizations in terms of visual quality and compression ratio.

Both video pre-processing filtering and CODEC compression target image sequence entropy reduction by achieveing noise reduction and redundancy reduction, respectively. The $J(\Delta x, \Delta yx)$ function is a very good combined optimization criterion.

If there is no information loss, the allocated bit rate must meet the following condition:

$$E(\Delta x, \Delta y) \leq R(\Delta x, \Delta y).$$

In reality, the bit rate target is usually set in advance for certain applications or markets, so there is a certain amount of room for entropy reduction. The entropy estimation can also use this guideline.

1.3 Motion Prediction For Efficient Initialization

Once the distortion function criterion is chosen, the motion estimation scheme starts with a motion vector prediction using neighboring blocks and blocks on adjacent frames with already computed motion vectors as the initialization of the pattern search. The scheme uses the motion vectors estimated from the following blocks:

9. The block at the top-left: $MV_{x-1,y-1}$
10. The block directly at the left: $WV_{x-1,y}$
11. The block directly at the top: $MV_{x,y-1}$
12. The block at the top-right: $MV_{x+1,y-1}$
13. The co-located block in the previous frame: $MV_{x,y}(k-1)$
14. The function (e.g., median, average etc.) of a combination of above positions:

$$MV_{x,y} = \text{MEDIAN}(MV_{x-1,y-1}, MV_{x-1,y}, \ldots, MV_{x,y}(k-1)).$$

The best prediction with minimum MSE distortion is chosen as the initial starting point for the fast motion estimation search.

The bilinear average of the top and left motion vectors is a usual and practical motion vector prediction choice.

In a practical implementation of the present invention, a direct choice from the above motion vectors can be made without any comparison. On the top border, the motion vector of the left block can be used. On the left border, the motion vector of the top block can be chosen. At the top-left position of a frame, the co-located block motion vector can be chosen.

1.4 Fast Search Method For Optimal Performance

Figure 1:
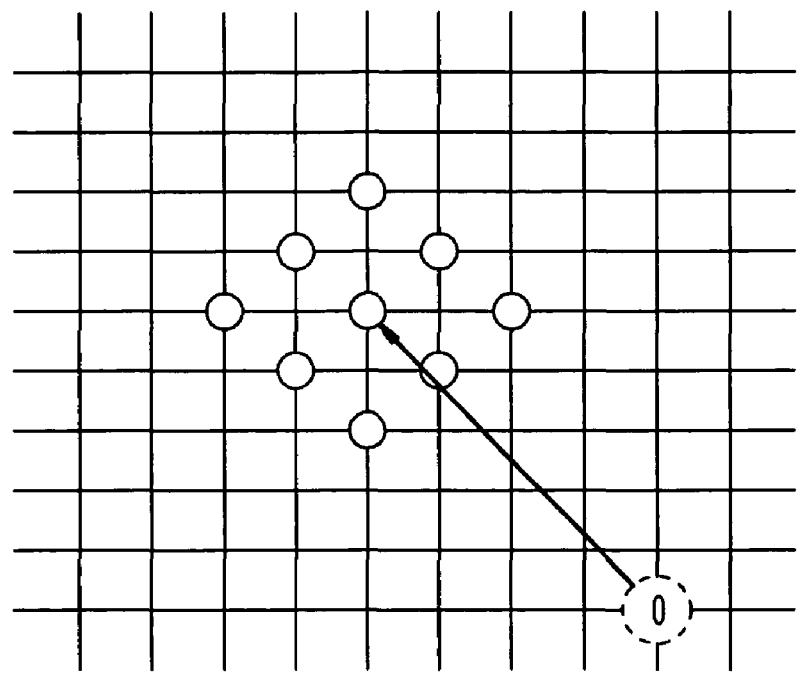
FIG. 1 is an illustration of a diamond search usable in a preferred embodiment of a fast search method in accordance with the present invention.

After the motion vector prediction initialization, a second aspect of the present invention is found in a fast search that starts from the position of the motion prediction result. The first search step (iteration) in accordance with the present invention will be a diamond search as depicted in FIG. 1. The diamond search is based on the motion vector field distributions of statistical characters of video sequences. It is derived from the probability distribution function with these locations corresponding to the highest probability of finding the matching block in the reference frame. It offers the advantage of extending the search support area at the first search iteration, allowing more reference frame coverage with fewer position computations.

The sparse nature of the diamond is a good way to approach the optimum neighborhood in a relatively faster fashion. However, the search needs to be made finer with the following nearest neighbor search, and the iteration of a diamond search is not necessary. Indeed, it could be harmful by jumping around.

Figure 2:
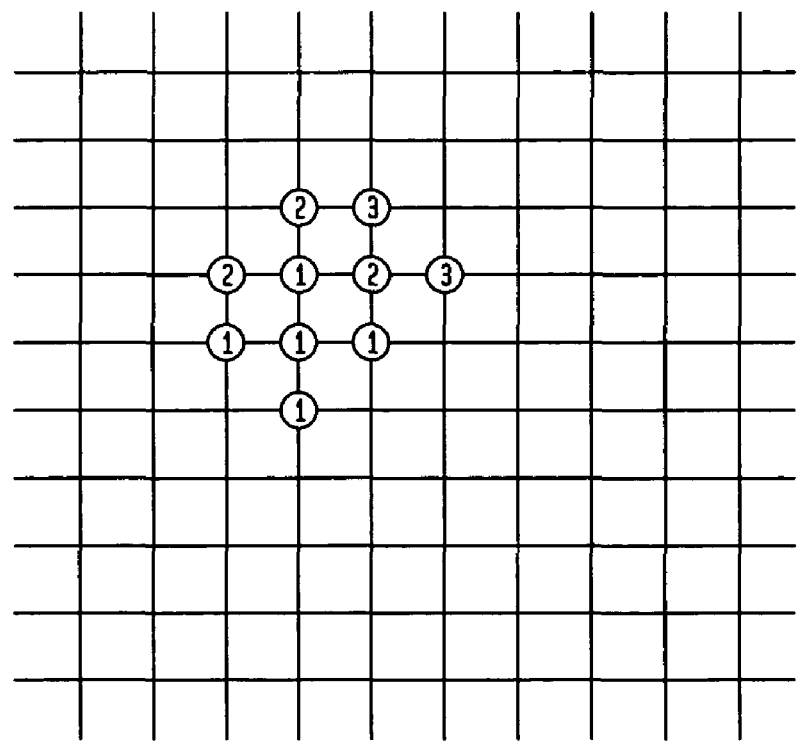
FIG. 2 is an illustration of a nearest neighbor search usable in a preferred embodiment of a fast search method in accordance with the present invention.

The following nearest neighbor search is shown in FIG. 2, and starts with MSE computations at the four nearest positions around the current position. Once the minimum MSE location is found and defined as the "best" location for this iteration, this best location is used as the new center and a new nearest neighbor search iteration is executed until no better position in terms of the MSE distortion function criterion has been found.

This proposed fast search scheme has a much lower computational complexity than a full search, but very closely approaches the performance of one.

For variable block sizes of matching block and variable sub-pixel motion vector accuracy, this motion estimation can be used without any change, which can be a huge advantage in the implementation speed-up. For instance, the motion estimation procedure integrates all computations of different block sizes with any conditional decisions and branching jumps which could result in pipeline flushing on parallel DSP platforms. Sub-pixel accuracy can be achieved with on-the-fly sub-pixel interpolations of nearest neighbor up-level pixels (points) without full frame sub-pixel interpolations, i.e., search and interpolation is performed in only the area that is needed.

The interpolation can be a simple bilinear interpolation, a six-tap filtering interpolation like the half-pixel interpolation in H.264, or any other suitable interpolation technique.

In order to get consistent and high subjective quality motion estimation results and avoid unnecessary computation, the idea of an adaptive motion search range cap is introduced. The motion range cap is adapted to the search block neighborhood environment to be, for instance, Beta ($\beta$) times the maximum or the arithmetic average of the neighboring block motion vectors.

For example, if the maximum is chosen, then:

$$M_{CAP} = \beta * \text{Max}(MV_{x-1,y-1}, MV_{x-1,y}, \ldots, MV_{x,y}(k-1)),$$

where $\beta$ can be an adaptive value or a constant, such as $$\beta = (1 + \text{Max}(MV_{x-1,y-1}, MV_{x-1,y}, \ldots, MV_{x,y}(k-1)),$$

or $\beta$=a constant in the range of 1.5 to 5, preferably equal to 2 or 3.

The introduction of an adaptive motion search range cap mechanism enables the present invention to deal gracefully, efficiently and smartly with such events and an incoming new object or other content, a flat, smooth area and a fast motion scenario.

2. Motion Estimation Scheme Implementation

The implementation of the proposed motion estimation scheme in accordance with the present invention can be very efficient on high-end VLIW and SIMD DSP platforms. The arithmetic operations can be carried out in parallel fashion. The data flow and current and reference block data have to be effectively architected and arranged based upon the specific processor architectures.

As noted above, the search range is determined dynamically and adaptively using the the adaptive motion search range cap $M_{CAP}$. Advantageously, a pre-defined maximum search range cap can be established providing an upper limit for $M_{CAP}$. Examples of the upper limit vary depending on the application, but advantageous examples range from 2048×2048 to 16×16, with 64×64 being a useful example. Similarly, the block size can vary depending on the application, with advantageous block choices being, for example, 16×16, 16×8, 8×16, 8×4, 4×8 and 4×4. The block size can also vary dynamically depending on one or several factors according to the search requirements.

At each step in the search procedure, the calculated positions should be stored to avoid the recalculation of the same positions in the next search step.

In order to get high visual quality, sub-pixel motion vector accuracy can be achieved by bilaterally interpolating near the neighbors of the searched best integer pixel position on-thefly. The motion accuracy can be integer pixel, half-pixel and quarter-pixel without requiring whole frame interpolations at half- or quarter-pixel levels.

3. Computational Complexity And Performance

By comparison with the full search motion estimation method, the proposed motion estimation scheme should be much faster at the integer pixel level, for instance, at least 40 times faster for a 64×64 integer pixel search range. Even faster results will show at sub-pixel levels.

Taking the L×S search range as an example, the total computational complexity for a full search algorithm is the number of positions at integer pixel level, N×M, times the distortion computation for each block.

Complexity\full=$L \times S \times MSE$.

The proposed scheme's complexity is the computation of motion prediction (fewer than five arithmetic operations), plus eight positions in the diamond search and a maximum of three positions in each nearest neighbor search step multiplied by the step number (the maximum is half of longer side of the search range), then times the distortion computation for each block:

Complexity\proposed$\leq 5+(8+3 \times StepNumber) \times MSE$, where $$StepNumber \leq \frac{L}{2}.$$

The performance of the proposed scheme approaches that of the full search method. In experiments, the performances of both methods are very close in terms of subjective and objective measurements.

4. Motion Estimation Applications

Motion estimation is used as a major component in many video processing and compression areas. Indeed, it constitutes most of the computation involved in many solutions such as encoding, transcoding and video enhancements. Therefore a faster and better performing motion estimation would significantly contribute to video processing and compression solutions.

The motion estimation in accordance with the present invention can be used separately for both video pre-processing and video coding. However, it can also be used for both in cascaded pre-processing and coding stages at the same time in a system, which would result in additional major resource savings in terms of computation, memory and data transfer for a very efficient and fast system implementation.

4.2 Pre-Processing Noise Filtering

The motion estimation search technique can be employed in a noise filter, e.g., applied in a pre-processing stage prior to encoding. Any type of motion estimated type of noise filtering can be employed with the motion estimation search technique of the invention. In an illustrative technique, a recursive 1-D temporal filter is applied to a current image (e.g., a frame picture) using a past image (e.g., a frame). For each block or macroblock of the current image to be filtered, a reference block or macroblock in the past, already filtered image is detected using the above-described motion estimation technique. Then, the following recursive 1-D temporal filter is applied to the block or macroblock of the current image to be filtered and the detected reference block or macroblock:

$$\hat{f}(i,j,k) = (1-\alpha(i,j,k)) \cdot \hat{f}_b(i,j,k) + \alpha(i,j,k) \cdot g(i,j,k)$$

where:
$\hat{f}(i,j,k)$ is an output filtered pixel at x,y coordinates i,j in an image of time t=k
$\hat{f}_b(i,j,k)$ is a previously filtered pixel at x,y coordinates i,j in the image of time t=k, i.e., the output filtered pixel at x,y coordinates i,j in the image of time t=k−1
$g(i,j,k)$ is the current input pixel of the block or macroblock undergoing filtering
$\alpha(i,j,k)$ is determined as:

$$\alpha(i,j,k) = \begin{cases} 1 & \text{if } |g(i,j,k) - \hat{f}(i,j,k-1)| \geq \tau \\ \alpha_g & \text{if } |g(i,j,k) - \hat{f}(i,j,k-1)| < \tau \end{cases}$$

$\alpha_g$ is determined as:

$$\alpha_g = 1 - \exp\left\{ \left( \frac{|g(i,j,k) - \hat{f}(i,j,k-1)|}{\beta} \right)^{\gamma} \right\}$$

$\beta$, $\gamma$ and $\tau$ are configurable parameters.

In the case of a first image of a sequence, noise filtering can be omitted, or some non-temporal form of noise filtering (which does not require a previous image) can be applied.

4.3 Pre-Processing Motion Estimation For An Encoder

In encoding environments, pre-processing provides encoding gain and visual enhancement by improving the quality of source-captured video sequences.

In the pre-processing stage, a spatial filter will smooth an intra image for noise reduction and visual improvement and a temporal filter will enhance a current image by filtering across several neighboring inter images. If the temporal filer follows a spatial filter, the smoothing effect by the spatial filter makes the second order moment criterion more important for the motion estimation in the following temporal filtering. The temporal filter would work better with the better motion direction estimation to preserve strong edges while filtering out noises.

Meanwhile, noise reduction by pre-filtering would help the encoder use the bit budget for real information in the image sequence by both reducing the variances of image or image difference amplitudes and by providing better motion estimation/compensation.

However, the motion estimation results from the pre-processing temporal filtering and the encoder should be almost identical if both motion estimation procedures use the same distortion function—especially if that distortion function is the MSE criterion. In the case of using the same distortion function, the encoder at the later stage can use the results of motion estimation from the pre-processing at the earlier stage as long as the blocks and their positions are the same. Put another way, the encoder can use the motion estimation of the pre-processing to speed up and improve its motion estimation and compensation.

4.4 Pre-Processing Motion Estimation for a Transcoder

In transcoding environments, pre-processing provides encoding gain and visual enhancement by improving the quality of video sequences corrupted in the compression, transmission or storage processes. The benefits mentioned in the previous section for the present invention stay true for the transcoding environment, except that the transcoding procedure includes a decoding stage before the pre-processing stage, and the encoding afterwards would be different from the previous video decoding model due to different video compression standards/algorithms.

In the transcoding environment, pre-processing in accordance with the present invention can play an even more important role which not only reduces the noise from the compressed video transmission or storage but also smoothes blocky artifact or compression distortion from the compression (coding and decoding) process. The spatial filtering is very effective in smoothing the block artifacts in block-based compression algorithms like MPEGs and H.26x, which is also very helpful for motion estimation in later stages.

Also, in the transcoding process, motion vectors obtained in the decoding stage can be used as an approximation and initial start point candidates in the motion prediction stage in accordance with the present invention.

5. Summary

Thus, a comprehensive pre-processing motion estimation scheme has been presented, including but not limited to the following innovative areas:

15. The combination and process of three major components: distortion criterion, motion prediction, and hybrid search.

16. The optimization object function J($\Delta$x, $\Delta$y) and MSE used in calculations for: optimal visual quality, unique application in variable block size encoding in an encoder or transcoder, entropy calculation combined with encoding bit rate control process, faster computation and implementation.

17. The new three-level motion search process from coarse to fine: motion vector prediction as efficient initialization, first-step diamond search, and on-the-fly nearest neighbor search, which yields faster results than a logarithmic value of the search range and optimal performance similar to the full search.

18. The unique idea of entropy reduction in motion estimation and its implementation.

19. The new idea and implementation of the combined motion estimation for both pre-processing and encoding/transcoding.

20. The on-the-fly neighboring motion (search) range adaptation to get a consistent and high quality motion result and avoid unnecessary computations.

21. The new on-the-fly nearest neighbor search with on-the-fly pixel interpolation for high motion vector accuracy at sub-pixel (fractional value) levels for high quality video compression and processing applications/markets.

22. The DSP implementation and optimization, memory architecture and data flow, and other optimal implementation details.

Although the invention has been described in its preferred forms with a certain degree of particularity, obviously many changes and variations are possible therein. It is therefore to be understood that the present invention may be practiced other than as specifically described herein without departing from scope and the sprit thereof.

I claim:

1. A method of fast motion estimation for video pre-processing, comprising the steps of:
   (A) selecting, using a microprocessor, a second-order distortion criterion for identifying a best reference image portion for comparison with a current image portion, said second-order distortion criterion being a Lagrange-optimized combination of a mean squared error criterion with an entropy criterion;
   (B) using said second-order distortion criterion to select, using a microprocessor, an initial reference image portion as an initial starting point for a motion estimation search, said initial starting position being chosen based on at least one motion vector from a neighboring image portion; and
   (C) performing, using a microprocessor, a fast motion estimation search including the steps of:
      (i) performing, using a microprocessor, a diamond search starting from said initial reference image portion using said second-order distortion criterion to identify a candidate best reference image portion;
      (ii) performing, using a microprocessor, a nearest neighbor search starting from the candidate best reference image portion using said second-order distortion criterion to identify either the candidate best reference image portion or a different neighboring reference image portion as a better reference image portion within a search range limited by an adaptive search range cap;
      (iii) re-identifying, using a microprocessor, the better reference image portion as the candidate best reference image portion;
      (iv) repeating, using a microprocessor, said steps (ii) and (iii) until in said step (ii) either (a) the candidate best reference image portion is identified as the better reference image portion so that said second-order distortion criterion cannot be improved, or (b) any further search would exceed the adaptive search range cap;
      (v) identifying, using a microprocessor, the candidate best reference image portion as the best reference image portion; and
      (vi) calculating, using a microprocessor, a motion vector from the best reference image portion.

2. A method of fast motion estimation for video pre-processing, comprising the steps of:
   (A) selecting, using a microprocessor, a second-order distortion criterion for identifying a best reference image portion for comparison with a current image portion, said second-order distortion criterion being a Lagrange-optimized combination of a mean squared error criterion with an entropy criterion; and
   (B) using said second-order distortion criterion to select, using a microprocessor, an initial reference image portion as an initial starting point for a motion estimation search, said initial starting position being chosen based on at least one motion vector from a neighboring image portion.
   (C) performing, using a microprocessor, a fast motion estimation search including the steps of:
      (i) performing, using a microprocessor, a diamond search starting from said initial reference image portion to identify a candidate best reference image portion;
      (ii) performing, using a microprocessor, a nearest neighbor search starting from the candidate best reference image portion to identify either the candidate best reference image portion or a different neighboring reference image portion as a better reference image portion within a search range;
      (iii) re-identifying, using a microprocessor, the better reference image portion as the candidate best reference image portion;
      (iv) repeating, using a microprocessor, said steps (ii) and (iii) until in said step (ii) either (a) the candidate best reference image portion is identified as the better reference image portion so that said second-order distortion criterion cannot be improved, or (b) any further search would exceed the adaptive search range cap; and (v) identifying, using a microprocessor, the candidate best reference image portion as the best reference image portion.

3. The method of claim 2, wherein said step of performing a diamond search starting from said initial reference image portion uses said second-order distortion criterion to identify a candidate best reference image portion.

4. The method of claim 3, wherein said step of performing a nearest neighbor search starting from the candidate best reference image portion uses said second-order distortion criterion to identify either the candidate best reference image portion or a different neighboring reference image portion as a better reference image portion within the search range.

5. The method of claim 4, wherein said step of performing a nearest neighbor search starting from the candidate best reference image portion uses said second-order distortion criterion to identify either the candidate best reference image portion or a different neighboring reference image portion as a better reference image portion within a search range limited by an adaptive search range cap.

6. The method of claim 2, wherein said step of performing a nearest neighbor search starting from the candidate best reference image portion uses said second-order distortion criterion to identify either the candidate best reference image portion or a different neighboring reference image portion as a better reference image portion within the search range.

7. The method of claim 6, wherein said step of performing a nearest neighbor search starting from the candidate best reference image portion uses said second-order distortion criterion to identify either the candidate best reference image portion or a different neighboring reference image portion as a better reference image portion within a search range limited by an adaptive search range cap.

8. The method of claim 7, further comprising the step of:
(vi) calculating, using a microprocessor, a motion vector from the best reference image portion identified in step (v).

9. The method of claim 6, wherein said step of performing a nearest neighbor search starting from the candidate best reference image portion identifies either the candidate best reference image portion or a different neighboring reference image portion as a better reference image portion within a search range limited by an adaptive search range cap.

10. The method of claim 9, further comprising the step of:
(vi) calculating, using a microprocessor, a motion vector from the best reference image portion identified in step (v).

11. Apparatus for performing fast motion estimation for video pre-processing, comprising:
(A) structure for selecting a second-order distortion criterion for identifying a best reference image portion for comparison with a current image portion, said second-order distortion criterion being a Lagrange-optimized combination of a mean squared error criterion with an entropy criterion;
(B) structure for using said second-order distortion criterion to select an initial reference image portion as an initial starting point for a motion estimation search, said initial starting position being chosen based on at least one motion vector from a neighboring image portion; and
(C) structure for performing a fast motion estimation search including:
(i) structure for performing a diamond search starting from said initial reference image portion using said second-order distortion criterion to identify a candidate best reference image portion;
(ii) structure for performing a nearest neighbor search starting from the candidate best reference image portion using said second-order distortion criterion to identify either the candidate best reference image portion or a different neighboring reference image portion as a better reference image portion within a search range limited by an adaptive search range cap;
(iii) structure for re-identifying the better reference image portion as the candidate best reference image portion;
(iv) wherein the nearest neighbor search and the re-identification are repeated until, in performing the nearest neighbor search, either (a) the candidate best reference image portion is identified as the better reference image portion so that said second-order distortion criterion cannot be improved, or (b) any further search would exceed the adaptive search range cap;
(v) structure for identifying the candidate best reference image portion as the best reference image portion; and
(vi) structure for calculating a motion vector from the best reference image portion.

12. A method of statistical content block matching for video pre-processing, comprising, in the recited order, the steps of:
First: (A) selecting, using a microprocessor, a second-order distortion criterion for identifying a best reference image portion for comparison with a current image portion, said second-order distortion criterion being a Lagrange-optimized combination of a mean squared error criterion with an entropy criterion;
Second: (B) using said second-order distortion criterion to select, using a microprocessor, an initial reference image portion as an initial starting point for a motion estimation search, said initial starting position being chosen based on at least one motion vector from a neighboring image portion; and
Third: (C) performing, using a microprocessor, a fast motion estimation search including the steps of:
Fourth: (i) performing, using a microprocessor, a diamond search starting from said initial reference image portion using said second-order distortion criterion to identify a candidate best reference image portion;
Fifth: (ii) performing, using a microprocessor, a nearest neighbor search starting from the candidate best reference image portion using said second-order distortion criterion to identify either the candidate best reference image portion or a different neighboring reference image portion as a better reference image portion within a search range limited by an adaptive search range cap;
Sixth: (iii) re-identifying, using a microprocessor, the better reference image portion as the candidate best reference image portion;
Seventh: (iv) repeating, using a microprocessor, said steps (ii) and (iii) until in said step (ii) either (a) the candidate best reference image portion is identified as the better reference image portion so that said second-order distortion criterion cannot be improved, or (b) any further search would exceed the adaptive search range cap;
Eighth: (v) identifying, using a microprocessor, the candidate best reference image portion as the best reference image portion; and
Nineth: (vi) calculating, using a microprocessor, a motion vector from the best reference image portion.

* * * * *

UNITED STATES PATENT AND TRADEMARK OFFICE
CERTIFICATE OF CORRECTION

| | |
|---|---|
| PATENT NO. | : 7,983,341 B2 |
| APPLICATION NO. | : 11/329685 |
| DATED | : July 19, 2011 |
| INVENTOR(S) | : Wang |

It is certified that error appears in the above-identified patent and that said Letters Patent is hereby corrected as shown below:

In Column 11, Line 20, delete "$WV_{x-1,y}$" and insert -- $MV_{x-1,y}$ --, therefor.

In Column 12, Line 51, after "using" delete "the".

In Column 13, Line 66, delete
" $\hat{f}(i,j,k) = (1 - \alpha(i,j,k)) * \hat{f}_b(i,j,k) + \alpha(i,j,k) * g(i,j,k)$ " and insert -- $\hat{f}(i,j,k) = (1 - \alpha(i,j,k)) * \hat{f}_b(i,j,k) + \alpha(i,j,k) * g(i,j,k)$ --, therefor.

In Column 16, Line 39, in Claim 2, after "criterion;" delete "and".

In Column 16, Line 45, in Claim 2, delete "portion." and insert -- portion; --, therefor.

Signed and Sealed this
Thirty-first Day of January, 2012

David J. Kappos
*Director of the United States Patent and Trademark Office*